United States Patent [19]

Herrmann

[11] 4,133,399  
[45] Jan. 9, 1979

[54] BORING DEVICE

[75] Inventor: Lothar Herrmann, Metzingen, Fed. Rep. of Germany

[73] Assignee: Wilhelm Hegenscheidt GmbH, Erkelenz, Fed. Rep. of Germany

[21] Appl. No.: 751,814

[22] Filed: Dec. 17, 1976

[30] Foreign Application Priority Data

Dec. 18, 1975 [DE] Fed. Rep. of Germany ....... 2556977

[51] Int. Cl.² .............................................. B23B 51/04
[52] U.S. Cl. .................................... 175/384; 175/408; 408/713
[58] Field of Search ............... 175/382, 384, 325, 383, 175/408; 408/81, 144, 158, 153, 161, 162, 705, 713

[56] References Cited

U.S. PATENT DOCUMENTS

| 149,639 | 4/1874 | Chandler | 175/408 X |
|---|---|---|---|
| 922,252 | 5/1909 | Buck | 175/384 X |
| 1,226,393 | 5/1917 | Skeen | 175/384 X |
| 1,600,073 | 9/1926 | Smith | 175/408 X |
| 2,097,040 | 10/1937 | Pivoto | 175/408 |
| 3,094,016 | 6/1963 | Kleine | 408/153 |
| 3,195,376 | 7/1965 | Bader | 408/713 X |
| 3,700,346 | 10/1972 | Eckle | 408/153 |
| 3,751,177 | 8/1973 | Faber | 175/325 X |
| 3,989,115 | 11/1976 | Ambrose | 175/384 |

FOREIGN PATENT DOCUMENTS

| 2235782 | 7/1972 | Fed. Rep. of Germany | 408/161 |
|---|---|---|---|
| 205573 | 10/1923 | United Kingdom | 408/153 |

*Primary Examiner*—Ernest R. Purser  
*Assistant Examiner*—Richard E. Favreau

[57] ABSTRACT

A boring device adapted for deep boring wherein the boring head has a plurality of cutting inserts adjustably mounted on the boring head. Axially extending guide plates are mounted on the periphery of the boring head and are substantially equidistantly disposed between adjacent cutting inserts.

4 Claims, 9 Drawing Figures

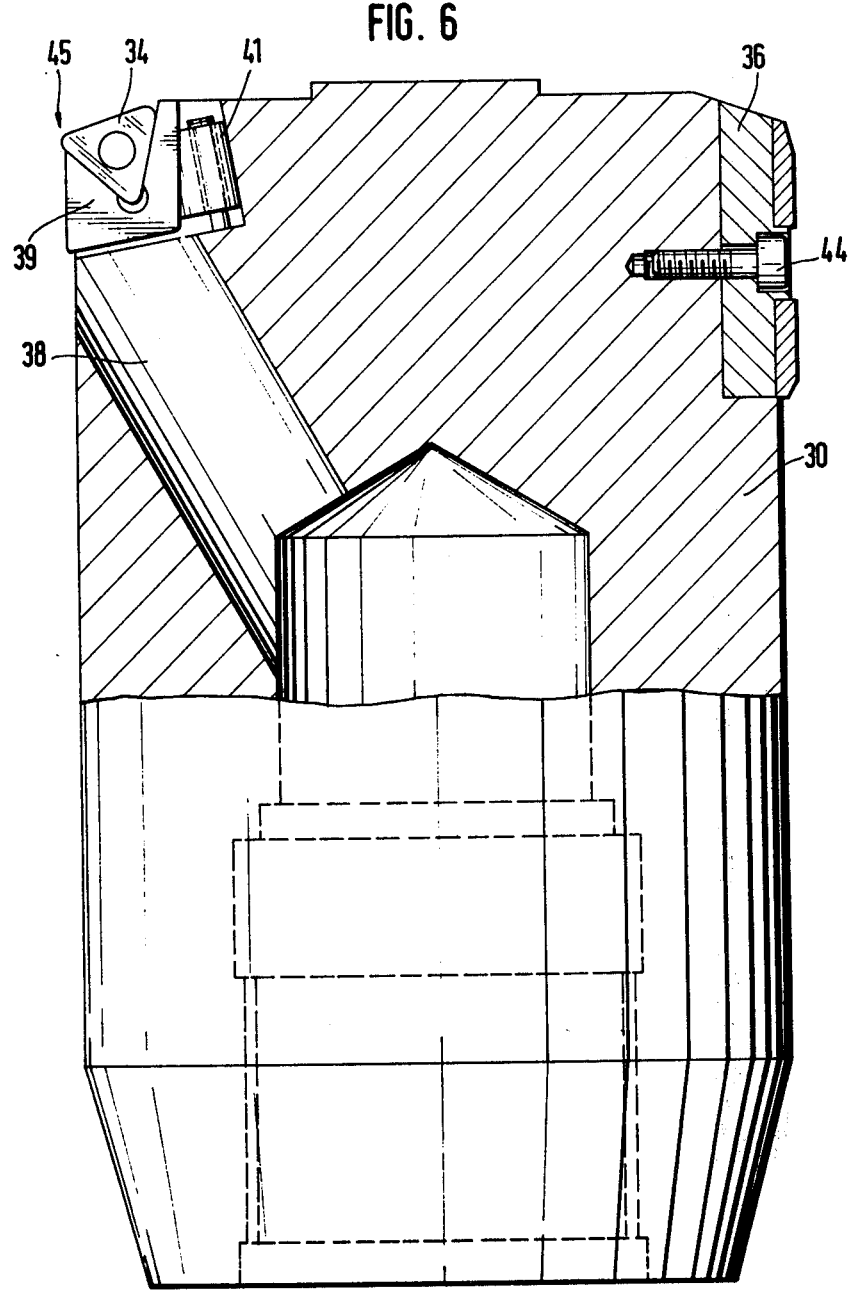

BORING DEVICE

The invention relates to a deep boring device having a boring head with a plurality of cutting inserts.

Boring heads having a plurality of cutting inserts for deep boring are already known. These deep boring devices have, however, the drawback that the individual seats in the bore head for the cutting inserts cannot be precisely manufactured so that after mounting the individual cutting inserts or blades in the borehead they are not precisely situated on a the same circle. However, this is an important requirement in deep boring devices.

It is therefore necessary, in the known deep boring devices, to round off the cutting inserts while sharpening them after they have been mounted in the boring head in order to obtain a flawless boring operation. This is particularly essential in very long bore holes to be worked. It has, in addition thereto been observed that the cutting inserts of the known deep boring devices frequently shift in position during the boring process and can therefore jam in the bore hole.

SUMMARY OF THE INVENTION

It is the general object of this invention to provide a deep boring device for boring bore holes without the danger of jamming of the borehead in the bore hole which is to expand even with increased boring and advancing speeds.

This object of the invention is obtained by providing the boring head, in combination with a plurality of cutting inserts, each of wich is individually radially adjustably mounted in said boring head, and axially extending guide plates mounted in said boring head between each pair of adjacent cutting inserts. The cutting inserts are individually adjustable. The cutting inserts can advantageously be of the reversible type and can in those cases were they are mounted on a borehead of a larger diameter, be mounted in a holding member. In the latter case, the holding member itself is radially slidably adjustable in the recess and can be clamped in position after having been adjusted. An adjustment member abuts against the holding member.

In a preferred embodiment of the deep boring device of this invention the cutting inserts are adjusted in such a way that the effective cutting edge of the individual inserts disposed at different distances from the longitudinal axis of the bore head and are offset relative to each other in the axial direction. This arrangement permits a plurality of cutting inserts to operate as pre-cutters and at least one of the cutting inserts to act as a finishing cutter. The last-mentioned cutting insert has a cutting edge the leading portion of which performs a barking or decorticating action on the to be cut material. The deep boring device of the invention distributes evenly the cutting load onto all of the cutting inserts and renders a very smooth bore wall. The guide plates mounted between the individual cutting inserts effect a flawless central guidance of the boring head, and ensure that this central guiding is maintained even when one of the cutting inserts accidentally falls out of the boring head.

Experiments have demonstrated that a deep boring device in accordance with the invention can bore at a substantially higher advancing speed than the boring devices of the state of the art. These positive results can be attributed not only to the fact that the cutting inserts are individually adjustable but also to the different shapes of the individual cutting inserts. Thus, for example, the cutting plates which act as pre-cutters are of the reversible type and have the shape of an equilateral triangle, the corner regions of which do not influence the bore wall finish, whereas the cutting plates acting as finishing cutters are provided with a broader cutting edge which has a barking edge portion. The barking edge portion of the finishing cutting plate determines the surface finish and effect a very smooth bore wall.

BRIEF DESCRIPTION OF THE DRAWING

The invention is further set forth in the following detailed description taken in conjunction with the appended drawing, in which:

FIG. 6 is a side view of the borehead of FIG. 5, partially in section along line VI—VI in FIG. 5;

DETAILED DESCRIPTION

Figure 1:
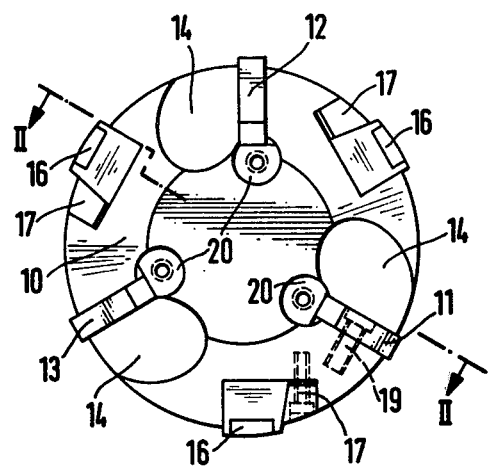
FIG. 1 is an end view of a borehead having a plurality of cutting members and having means for internally removing chips, turnings, shavings, etc.

The embodiment of the invention illustrated in FIGS. 1-4 includes a deep boring device, in accordance with the invention, which has a borehead 10 on the periphery of which there are mounted relative to the direction of rotation of the boring head three cutting inserts 11, 12 and 13. In front of each cutting insert there is disposed a chips and shavings receiving mouth 14 which is in communication with a chips or shaving channel 15 (see FIG. 2) for carrying off the chips and shavings. There are, furthermore, provided three recesses 18, each one of which extends axially longitudinally along the periphery of the borehead (see FIG. 2). Each longitudinal recess 18 is disposed substantially equidistantly between two adjacent cutting inserts. A guide plate 16 is mounted in each recess 18 and is held in position therein by means of a wedge 17, which in turn is adapted to be secured in position by a suitable screw or bolt. By loosening the screw or bolt the wedge 17 can be removed from the recess 18 and the guide plate 16 can thereafter be exchanged.

Figure 3:
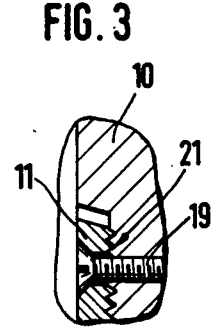
FIG. 3 is a partial sectional view along the line III—III in FIG. 2.
Figure 4:
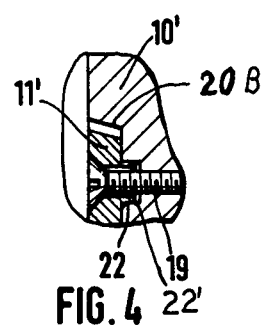
FIG. 4 is a corresponding partial sectional view of an alternate embodiment of the stepped contacting surface of the cutting inserts, corresponding to the view of FIG. 3.
Figure 2:
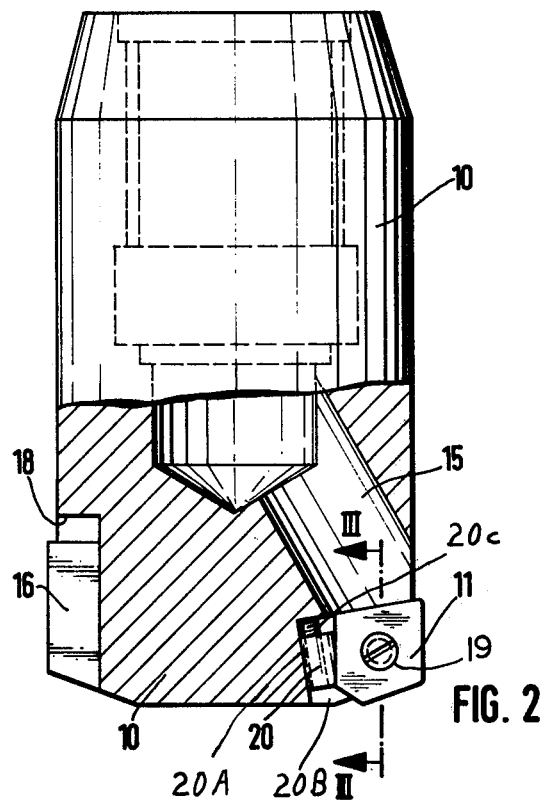
FIG. 2 is a partial sectional side view of the borehead illustrated in FIG. 1, along line II—II in FIG. 1.

All three cutting inserts 11, 12 and 13 are radially adjustable and can be individually held in position by means of a screw 19 (see FIG. 1) which is threaded into a mating bore in the boring head 10. The radial adjustment of the cutting inserts 11, 12 and 13 is carried out by means of an adjusting wedge 20 (see FIG. 2), which is mounted between the edge of the respective cutting insert a stop wall 20A of a recess 20B for accommodating the respective cutting insert in the boring head 10. The position of the wedge 20 in the recess 20B can be adjusted by means of an adjusting screw 20c. The cutting inserts 11, 12 and 13 can be adjusted without deviation by providing each with a stepped surface which engages with a stepped mating surface in the respective recess 20B of the boring head 10. In this manner the cutting insert firmly engages with a mating surface in the boring head 10 and thereby a lateral shifting of the plate is prevented. There is illustrated in FIG. 3 one possible embodiment of mating stepped surfaces for the recess 20B and the insert 11. In FIG. 3 these stepped surfaces take the form of mating toothed surfaces 21. In the embodiment of FIG. 4 the cutting insert 11' is provided with a projecting collar 22 which matingly engages a suitable dimensioned recess 22' of the primary recess 20B' of the borehead 10'. The screw or threaded bolt 19 extends through a suitable slot shaped opening (not illustrated) in the cutting insert. Before the cutting inserts 11, 12 and 13 can be adjusted the corresponding holding screws or threaded bolts 19 have to be loosened. After the cutting inserts have been adjusted to the correct diameter position the cutting inserts are secured in position by threading the screws or threaded bolts 19 into the corresponding threaded bores of the boring head 10.

It should be noted that the three cutting inserts 11-13 of the boring head 10 can assume different cutting positions and may have different cutting edges. For example, the cutting inserts 11 and 12 can have pre-cutting edges and the finishing cutting operation may be carried out by means of the third cutting insert 13 which is provided with a corresponding finishing cutting edge. The different adjustments and shapes of the individual cutting edges will be explained in greater detail in conjunction with the embodiment illustrated in FIGS. 5-8.

Figure 5:
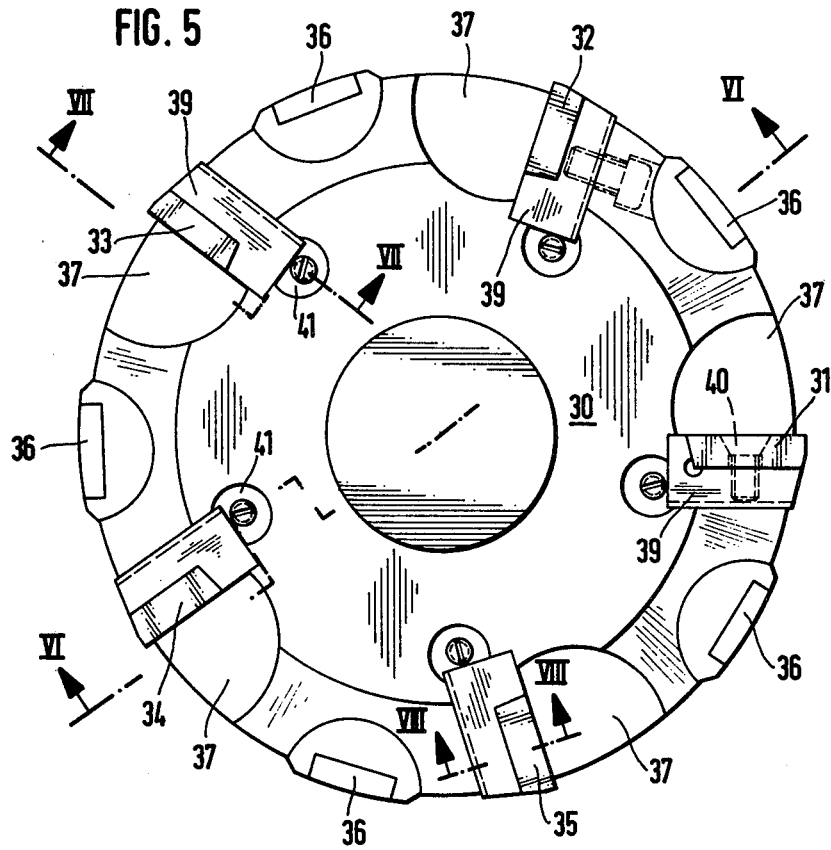
FIG. 5 is an end view of a borehead having a substantially larger diameter than the boring head of FIG. 1.
Figure 9:
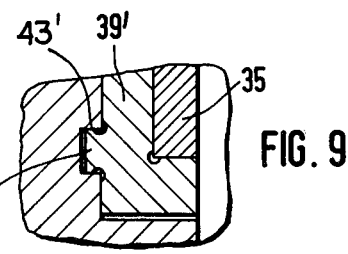
FIG. 9 is a sectional view corresponding to FIG. 8 with an alternate shape similar to the shape of the cutting insert according to FIG. 4.
Figure 8:
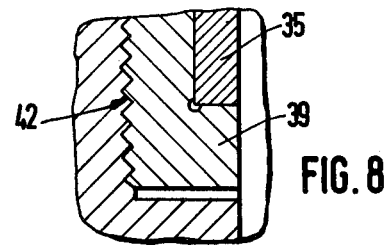
FIG. 8 is a partial sectional view through a cutting insert along line VIII—VIII in FIG. 5.

As can be best seen in FIGS. 5-6, there is illustrated a boring head 30 having a relatively large diameter. Five cutting inserts 31, 32, 33, 34 and 35 are mounted along the periphery of the boring head 30 equidistant from each other. In this embodiment of the boring head there are also provided guiding plates 36 substantially equidistantly disposed between adjacent cutting inserts. Similar to the embodiment in FIGS. 1-4, there are provided chips and shaving mouths 37 in front, relative to the rotational direction of the boring head, of each cutting insert. These guide plates 36 are mounted in mating recesses axially extending along the periphery of the boring head 30. Each chips and shavings mouth 37 is in communication with a discharge channel 38 for internally removing the chips and shavings which form during the boring process. In contradistinction to the embodiment of FIGS. 1-4, the cutting inserts are not directly mounted on the boring head 30, but are mounted in separate holding members 39 and are held in position therein by means of screws 40 (see FIG. 5). The holding members 39 are radially adjustable by means of wedges 20' and adjusting screws 20c' in a manner analogous to the embodiment of FIGS. 1-4. The holding members 39 are also maintained in position in a corresponding recess of the boring head 30 by means of stepped surfaces in a manner analogous to the embodiment of FIGS. 1-4. In the embodiment of FIG. 8 the stepped surfaces take the form of toothed surfaces 42. In the embodiment of FIG. 9 the stepped surfaces take the form of a projection 43 which engages in a mating recess 43' in the boring head 30. The interengagement of the stepped surfaces prevents a shifting or deviation of the cutting insert in the boring head 30 during a drilling operation.

Figure 7:
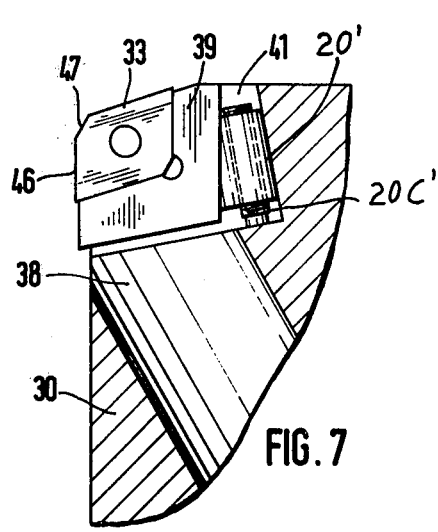
FIG. 7 is a partial sectional view through the boring head along line VII—VII in FIG. 5.

The guide plates 36 are not radially adjustable. However, as can be seen in FIG. 6, these guide plates may be exchanged by loosening a threaded bolt 44 and be replaced by other guide plates 36. In preparing the deep well boring device it is necessary, first of all, to mount the guide plates 36 in the boring head 30 and to round off the boring head thereafter. Then the holding members 39 with the cutting inserts 31-35 are mounted in the boring head 30. Of the five cutting inserts, four cutting inserts may, for example, have pre-cutting edges. For example, the cutting inserts 31, 32, 34 and 35 may have pre-cutting edges, whereas the cutting insert 33 has a finishing cutting edge. In FIG. 6 there is illustrated the cutting insert 34 with the pre-cutting edge 45. In FIG. 7 the cutting insert 33 with a finishing cutting edge 46 is illustrated. All cutting inserts 31-35 are formed as reversible cutting inserts. The pre-cutting inserts 31, 32, 34 and 35 are shaped as equilateral triangle plates. The holding member 39 for the precutting insert is always adjusted in such a way that the operating cutting edge 45 (see FIG. 6) is in a slight radially retracted position relative to the finishing cutting edge 46 of the finishing cutting insert 33. In addition thereto the effective cutting edges of the pre-cutting inserts 31, 32, 34 and 35 are situated with respect to the axis of the boring head 30 and the advancing direction of the boring head 30, in front of the effective cutting edge 46 of the finishing insert 33. At the level of the cutting edges 45 of the pre-cutting inserts, the finishing cutting insert 33 is provided with a skewed cutting edge 47 which serves for barking the to be finished surface and effects a smooth cut bore hole.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

What is claimed is:

1. A deep boring device, comprising in combination, a boring head;
    a plurality of cutting inserts individually radially adjustably mounted in said boring head;
    each cutting insert having a stepped surface and said boring head has a mating stepped surface, said stepped surfaces of said boring head and cutting inserts meshingly interengaging each other when said cutting inserts are operatively mounted in said boring head; and
    at least one axially extending guide plate mounted in said boring head between each pair of adjacent cutting inserts.

2. A deep boring device, comprising in combination, a boring head;
    a plurality of cutting inserts individually radially adjustably mounted in said boring head;
    each one of said cutting inserts has at least one cutting edge, at least one of the cutting edges of the individual cutting inserts being slightly differently radially spaced than the other cutting edges from the axis of the boring head, at least one of said cutting edges also being staggered in the axial direction relative to the other cutting edges and
    at least one axially extending guide plate mounted on said boring head between each pair of adjacent cutting inserts.

3. The boring device as set forth in claim 2, wherein a plurality of the cutting inserts operate as precutters, at least one cutting insert operates as a finishing cutter, said cutting insert operating as a finishing cutter has a barking cutting edge and a finishing cutting edge.

4. The boring device as set forth in claim 3, wherein said cutting inserts operating as precutters have the shape of equilateral triangles.

* * * * *